United States Patent [19]
Krivak et al.

[11] Patent Number: 5,911,963
[45] Date of Patent: Jun. 15, 1999

[54] AMORPHOUS PRECIPITATED SILICA HAVING A LOW PROPORTION OF SMALL PORES

[75] Inventors: Thomas G. Krivak, Harrison City; Larry E. Jones, Pittsburgh, both of Pa.

[73] Assignee: PPG Industries Ohio, Inc., Cleveland, Ohio

[21] Appl. No.: 08/439,731

[22] Filed: May 12, 1995

[51] Int. Cl.⁶ .......................... C01B 33/143; C01B 33/14
[52] U.S. Cl. .............................................. 423/335; 423/339
[58] Field of Search ...................................... 423/335, 339

[56] References Cited

U.S. PATENT DOCUMENTS

| | | | |
|---|---|---|---|
| 2,657,149 | 10/1953 | Iler | 106/308 |
| 4,590,052 | 5/1986 | Chevallier et al. | 423/335 |
| 4,704,425 | 11/1987 | Lagarde et al. | 423/339 |
| 4,708,859 | 11/1987 | Chevallier | 423/335 |
| 4,874,594 | 10/1989 | Chevallier | 423/339 |
| 4,906,446 | 3/1990 | Engelbrecht et al. | 423/335 |
| 5,009,874 | 4/1991 | Parmentier et al. | 423/335 |
| 5,034,207 | 7/1991 | Kerner et al. | 423/339 |
| 5,094,829 | 3/1992 | Krivak et al. | 423/339 |
| 5,123,964 | 6/1992 | Kerner et al. | 423/339 |
| 5,227,425 | 7/1993 | Rauline | 524/493 |
| 5,342,598 | 8/1994 | Persello | 423/339 |
| 5,395,605 | 3/1995 | Billion et al. | 423/339 |

FOREIGN PATENT DOCUMENTS

| | | |
|---|---|---|
| 157703 | 10/1985 | European Pat. Off. . |

*Primary Examiner*—David Brunsman
*Attorney, Agent, or Firm*—George D. Morris

[57] ABSTRACT

Amorphous precipitated silica having a low proportion of small pores as evidenced by low Sears surface areas are useful as reinforcing pigments for various rubbers.

3 Claims, No Drawings

AMORPHOUS PRECIPITATED SILICA HAVING A LOW PROPORTION OF SMALL PORES

Variations in the parameters and/or conditions during production result in variations in the types of amorphous precipitated silicas produced. Although they are all broadly amorphous precipitated silicas, the types of amorphous precipitated silicas often differ significantly in physical properties and sometimes in chemical properties. These differences in properties are important and often result in one type being especially useful for a particular purpose but of marginal utility for another purpose, whereas another type is quite useful for that other purpose but only marginally useful for the first purpose.

Many different amorphous precipitated silicas are known and some of them have been used as reinforcing pigments in organic rubbers and in silicone rubbers. Because of their differing physical (and sometimes chemical) properties, each amorphous precipitated silica performs somewhat differently as a reinforcing pigment. A new amorphous precipitated silica has been discovered which contains a small proportion of small pores. Therefore the new amorphous precipitated silica is characterized by a small Sears surface area which is indicative of a small proportion of small pores. This new amorphous precipitated silica is particularly useful as a reinforcing pigment for organic rubber. Accordingly, one embodiment of the invention is a statistically large population of substantially dry free-flowing particles of amorphous precipitated silica characterized on a coating-free and impregnant-free basis by: (a) a BET surface area in the range of from 100 to 300 square meters per gram ($m^2/g$), (b) a CTAB surface area in the range of from 85 to 250 $m^2/g$, (c) a Sears surface area in the range of from 190 to 290 $m^2/g$, and (d) a pore diameter at the maximum of the volume pore size distribution function in the range of from 10 to 60 nanometers (nm).

Amorphous precipitated silicas are most commonly produced by precipitation from an aqueous solution of sodium silicate using a suitable acid such as sulfuric acid, hydrochloric acid, and/or carbon dioxide. Processes for producing amorphous precipitated silicas and the properties of the products are described in detail in U.S. Pat. Nos. 2,657,149; 2,940,830; 4,495,167, 4,681,750, and 5,094,829.

Although both are silicas, it is important to distinguish amorphous precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579.

Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Amorphous precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Amorphous precipitated silica, then, may be described as precipitated aggregates of ultimate particles of colloidal amorphous silica that have not at any point existed as macroscopic gel during the preparation. The sizes of the aggregates and the degree of hydration may vary widely.

Amorphous precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

The BET surface area of the amorphous precipitated silica of the present invention may vary somewhat, but usually the BET surface area is in the range of from 100 to 300 $m^2/g$. Often the BET surface area is in the range of from 125 to 250 $m^2/g$. From 150 to 180 $m^2/g$ is preferred. As used in the present specification and claims, the BET surface area of the amorphous precipitated silica is the surface area determined by the Brunauer, Emmett, Teller (BET) method according to STM C 819–77 using nitrogen as the adsorbate but modified by outgassing the system and the sample for one hour at 180° C.

The CTAB surface area of the amorphous precipitated silica of the present invention may vary, but in most instances the CTAB surface area is in the range of from 85 to 250 $m^2/g$ Often the CTAB surface area is in the range of from 120 to 185 $m^2/g$. From 145 to 165 $m^2/g$ is preferred. As used in the present specification and claims, the CTAB surface area of the amorphous precipitated silica is the CTAB surface area determined in accordance the following procedure: Using a top loader balance, 11.0 grams of cetyltrimethylammonium bromide, also known as CTAB and as hexadecyltrimethylammonium bromide, [CAS 57-09-0] is weighed to the nearest one-tenth milligram and the weight expressed in grams, C, is recorded. The weighed CTAB is dissolved in distilled water and diluted with distilled water to 2 liters in a volumetric flask to form a standard CTAB solution which is stored in the dark for at least 12 days before use. Using a top loader balance, 3.70 grams of Aerosol® OT sodium di(2-ethylhexyl) sulfosuccinate [CAS 577-11-7] (American Cyanamid Co., Wayne, N.J.) is weighed. The weighed Aerosol® OT sodium di(2-ethylhexyl) sulfosuccinate is dissolved in distilled water and diluted with distilled water to 2 liters in a volumetric flask to form a standard Aerosol® OT solution which is stored in the dark for at least 12 days before use. The useful storage lives of the standard CTAB solution and the standard Aerosol® OT solution are two months after preparation. Using a pipet, 10.0 mL of the CTAB standard solution is transferred to a 250 mL Erlenmeyer flask containing a stirring bar. Next, 30 mL chloroform, 50 mL distilled water, 15 drops of 0.02% bromophenol blue aqueous indicator solution, and one drop of 1N aqueous NaOH solution are added to the flask. With vigorous stirring but minimal splashing, the contents of the Erlenmeyer flask are titrated with the standard Aerosol® OT solution from a 50 mL buret. The titration is begun at a rapid drop rate (the stopcock is never wide open) down to about 25 to 30 mL and then more slowly, dropwise, to the end point which will occur at about 37.5 mL. The approach to the end point is characterized first by a milky blue color throughout. Then, as the end point is more closely approached, the bottom chloroform layer becomes a more intense blue and the top aqueous layer takes on a lilac or purple hue. Immediately before the end point, the whole mixture becomes visibly clearer (i.e., less "milky") and the bottom layer is seen as a very intense blue. Using a wash bottle, the inside of the flask is washed down with no more than 25 mL of distilled water. The stirrer speed is increased to resume vigorous mixing for efficient contacting of the two liquid phases. At least 10 seconds are allowed to elapse after each dropwise addition of titrant immediately prior to the endpoint. Stirring is stopped frequently to allow the phases to separate so that the analyst can become familiar with these color changes and then vigorous stirring is resumed. At the end point the bottom phase loses all color and displays a colorless or milky white appearance while the top phase is intensely purple. The procedure is performed at least two times and the average volume of standard Aerosol® OT solution used per titration, V1, is recorded. A 200 mL wide mouth glass bottle is tared and approximately 0.500 gram of silica sample (in the as-received state, not dried) is placed in the bottle and weighed to the nearest 0.1 mg. This silica sample weight, S, is recorded. One hundred milliliters of the standard CTAB solution is pipetted into the bottle and a stirring bar is carefully added. Using a 50 mL pipet, filling and delivering twice, is preferred as the liquid level is easier to control than with a 100 mL pipet. A cap is screwed on the bottle and the contents are stirred gently for 15 minutes without pH adjustment. A pH electrode is placed into the solution in the bottle and gentle stirring is resumed. The pH is adjusted to between 9.0 and 9.5 using 1N aqueous NaOH added dropwise; approximately 5 drops of the 1N NaOH solution are required before the pH stabilizes between 9.0 and 9.5. When the pH has been stabilized between 9.0 and 9.5, the top of the bottle is covered with aluminum foil or equivalent to retard evaporation loss. The mixture is stirred gently for one hour at pH 9.0 to 9.5. The silica-liquid mixture is transferred to centrifuge tubes, balancing them by weighing on a top loader balance. The mixture is centrifuged for 30 minutes to produce a clear centrifugate. Clear centrifugate is carefully withdrawn using a dropping pipet and transferred to a small glass bottle. Using a pipet, 10.0 mL of the centrifugate is transferred into a 250 mL Erlenmeyer flask containing a stirring bar. Next, 30 mL chloroform, 50 mL distilled water, and 15 drops of 0.02% bromophenol blue aqueous indicator solution are added to the flask. The contents of the Erlenmeyer flask are titrated with the standard Aerosol® OT solution from a 50 mL buret using the same procedure and to the same endpoint used in titrating the standard CTAB solution. The volume of standard Aerosol® OT solution used, $V_2$, is recorded. A small glass bottle (less cap) is heated for 2 hours at 105° C. in an oven and cooled in a desiccator. The weight is recorded to the nearest 0.1 mg. Approximately one gram of silica sample is added to the bottle and the weight is recorded to the nearest 0.1 mg. The bottle and the sample are heated in an oven for 2 hours at 105° C. The bottle containing the sample is removed from the oven, immediately capped, and cooled in a desiccator.

When cooled to ambient temperature, the cap is removed and the weight of the bottle containing the sample is recorded to the nearest 0.1 mg. The tare weight of the bottle is subtracted from the sample weighings and the weight in grams of the silica before s heating, A, and the weight in grams of the silica after heating, B, are recorded. The CTAB surface area (dry basis), $A_{CTAB}$, expressed in $m^2/g$, is calculated according to the formula:

$$A_{CTAB} = \frac{(V_1 - V_2)(C)(A)(28.92)}{(V_1)(S)(B)}$$

The Sears surface area of the amorphous precipitated silica of the present invention may vary somewhat, but usually the Sears surface area is in the range of from 190 to 290 $m^2/g$. Often the Sears surface area is in the range of from 200 to 265 $m^2/g$. From 210 to 240 $m^2/g$ is preferred. As used in the present specification and claims, the Sears surface area of the amorphous precipitated silica is the Sears surface area determined in accordance the following procedure: A sample containing 1.50 grams of amorphous precipitated silica is diluted with $CO_2$-free distilled water at 25° C. to a concentration of 2 to 3 percent by weight $SiO_2$. The mixture is acidified with hydrochloric acid to about pH 3 and diluted with $CO_2$-free distilled water to a volume of 135 mL. Thirty grams of pure crystalline NaCl is added and the mixture is stirred rapidly. As soon as the salt is dissolved, the pH is adjusted to pH 4.0 with 0.1N aqueous NaOH. A "high sodium" (Beckman Type E or equivalent) glass electrode is used. The mixture is rapidly titrated from pH 4.0 to pH 9.0 with 0.1N aqueous NaOH and the volume, $V_t$, is recorded after the pH has remained at 9.0±0.05 for 10 minutes. A blank is prepared as above except that silica is absent. The blank is rapidly titrated from pH 4.0 to pH 9.0 with 0.1N aqueous NaOH and the volume, $V_b$, is recorded after the pH has remained at 9.0+0.05 for 10 minutes. The Sears surface area, $A_{SEARS}$, expressed in $m^2/g$, is calculated according to the formula:

$$A_{SEARS} = 26.4 \, (V_t - V_b)$$

The above procedure is a modification of that described by G. W. Sears, Jr., *Analytical Chemistry*, Volume 28, No. 12 (December 1956) pages 1981–1983.

The pore diameter at the maximum of the volume pore size distribution function of the amorphous precipitated silica of the present invention may vary, but in most cases the pore diameter at the maximum of the volume pore size distribution function is from 10 to 60 nanometers. Often the pore diameter at the maximum of the volume pore size distribution function is from 20 to 50 nm. Preferably the pore diameter at the maximum of the volume pore size distribution function is from 20 to 35 nm. The volume average pore size distribution function of the amorphous precipitated silica is determined by mercury porosimetry using an Autoscan mercury porosimeter (Quantachrome Corp.) in accordance with the accompanying operating manual. In operating the porosimeter, a scan is made in the high pressure range (from about 103 kilopascals absolute to about 227 megapascals absolute). The volume pore size distribution function is given by the following equation:

$$D_v(d) = \frac{P\,dV}{d\,dP}$$

where:

$D_v(d)$ is the volume pore-size distribution function, expressed in $cm^3/(nm \cdot g)$;

d is the pore diameter, expressed in nm;

P is the pressure, usually expressed in pounds per square inch, absolute; and

V is the pore volume per unit mass, usually expressed in $cm^3/g$.

Where the data are continuous or substantially continuous (i.e., small intervals between successive values of P), Dv(d) is determined by taking $\Delta V/\Delta P$ for small values of $\Delta P$ from either a plot of V versus P or preferably from the raw data. Each value of $\Delta V/\Delta P$ is multiplied by the pressure at the upper end of the interval and divided by the corresponding pore diameter. The resulting value is plotted versus the pore diameter. The value of the pore diameter at the maximum of the volume pore size distribution function is then taken from the plotted graph. Numerical procedures or other graphical procedures for estimating $\Delta V/\Delta P$ may be used when desired or when necessary due to large intervals between successive values of P.

It has been found that by controlling the conditions of silica precipitation and multiple reinforcement steps, new silicas may be produced having properties that make them especially useful as reinforcing pigments for organic rubbers and for silicone rubbers. They also may be used for many of the purposes for which other types of precipitated silicas have been used.

Accordingly, another embodiment of the invention is a process for producing amorphous precipitated silica characterized on a coating-free and impregnant-free basis by a BET surface area in the range of from 100 to 300 square meters per gram ($m^2/g$), a CTAB surface area in the range of from 85 to 250 $m^2/g$, a Sears surface area in the range of from 190 to 290 $m^2/g$, and a pore diameter at the maximum of the volume pore size distribution function in the range of from 10 to 60 nm, the process comprising: (a) establishing an initial aqueous alkali metal silicate solution containing from 0.5 to 4.5 weight percent $SiO_2$ and having an $SiO_2:M_2O$ molar ratio of from 1.6 to 3.9; (b) over a period of at least 10 minutes and with agitation, adding acid to the initial aqueous alkali metal silicate solution at a temperature at or below 98° C. to neutralize at least 60 percent of the $M_2O$ present in the initial aqueous alkali metal silicate solution and thereby to form a first reaction mixture; (c) over a period of from 30 to 180 minutes, with agitation, and at a temperature of from 85° C. to 98° C., substantially simultaneously adding to the first reaction mixture: (1) additive-aqueous alkali metal silicate solution, and (2) acid, thereby to form a second reaction mixture wherein the amount of the additive aqueous alkali metal silicate solution added is such that the amount of $SiO_2$ added is from 0.5 to 2.0 times the amount of $SiO_2$ present in the initial aqueous alkali metal silicate solution established in step (a) and wherein the amount of the acid added is such that at least 60 percent of the $M_2O$ contained in the additive aqueous alkali metal silicate solution added during the simultaneous addition is neutralized; (d) adding acid to the second reaction mixture with agitation at a temperature of from 85° C. to 98° C. to form a third reaction mixture having a pH below 9.3; (e) aging the third reaction mixture with agitation at a pH below 9.3 and at a temperature of from 85° C. to 98° C. for a period of from 0 to 120 minutes; (f) forming a fourth reaction mixture by adding to the aged third reaction mixture with agitation and at a temperature of from 85° C. to 98° C., a further quantity of additive aqueous alkali metal silicate solution and adding acid as necessary to maintain the pH at from 8.0 to 9.3 during the addition of the further quantity of the additive aqueous alkali metal silicate solution, wherein: (1) the amount of the additive aqueous alkali metal silicate solution added in step (f) is such that the amount of $SiO_2$ added in step (f) is from 0.5 to 0.75 times the amount of $SiO_2$ present in the third reaction mixture, and (2) the additive aqueous alkali metal silicate solution is added in step (f) over a period of at least 30 minutes; (g) aging the fourth reaction mixture with agitation at a temperature of from 85° C. to 98° C. for a period of from 5 to 60 minutes; (h) adding acid to the aged fourth reaction mixture with agitation at a temperature of from 85° C. to 98° C. to form a fifth reaction mixture having a pH below 7.0; (i) aging the fifth reaction mixture with agitation at a pH-below 7.0 and at a temperature of from 85° C. to 98° C. for a period of at least 1 minute; (j) separating precipitated silica from most of the liquid of the aged fifth reaction mixture; (k) washing the separated precipitated silica with water; and (l) drying the washed precipitated silica, wherein: (m) the alkali metal silicate is lithium silicate, sodium silicate, potassium silicate, or a mixture thereof; and (n) M is lithium, sodium, potassium, or a mixture thereof.

Optionally, prior to step (c) the first reaction mixture is aged with agitation at a temperature of from 85° C. to 95° C. for a period of from 5 to 120 minutes.

The composition of the additive aqueous alkali metal silicate solution may vary widely. Usually the additive aqueous alkali metal silicate solution comprises from 2 to 30 percent by weight $SiO_2$. Often the additive aqueous alkali metal silicate solution comprises from 10 to 25 percent by weight $SiO_2$. From 15 to 20 weight percent $SiO_2$ is preferred. Usually the additive aqueous alkali metal silicate solution has an $SiO_2:M_2O$ molar ratio of from 1.6 to 3.9. In many cases the $SiO_2:M_2O$ molar ratio is from 2.5 to 3.6. Frequently the $SiO_2:M_2O$ molar ratio is from 2.9 to 3.5. Preferably the $SiO_2:M_2O$ molar ratio is from 3.1 to 3.3. Additive aqueous alkali metal silicate solution having the same composition may be used throughout the various silicate additions, or additive aqueous alkali metal silicate solutions having differing compositions may be used in different silicate addition steps.

The composition of the initial aqueous alkali metal silicate solution established in step (a) may also vary widely. Generally the initial aqueous alkali metal silicate is solution comprises from 0.5 to 4.5 weight percent $SiO_2$. Often the initial aqueous alkali metal silicate solution comprises from 1.4 to 4.5 weight percent $SiO_2$. In many cases the initial aqueous alkali metal silicate solution comprises from 1.2 to 3.9 weight percent $SiO_2$. From 1.5 to 3.6 weight percent $SiO_2$ is preferred. Usually the initial aqueous alkali metal silicate solution has an $SiO_2:M_2O$ molar ratio of from 1.6 to 3.9. In many cases the $SiO_2:M_2O$ molar ratio is from 2.5 to 3.6. Frequently the $SiO_2:M_2O$ molar ratio is from 2.9 to 3.5. Preferably the $SiO_2:M_2O$ molar ratio is from 3.1 to 3.3.

The acid used in the process may also vary widely. In general, the acid added in steps (b), (c), and (g) should be strong enough to neutralize alkali metal silicate and cause precipitation of silica. The acid added in steps (d) and (i) should be strong enough to reduce the pH to desired values within the specified ranges. The acid used in the various acid addition steps may be the same or different, but preferably it is the same. A weak acid such as carbonic acid produced by the introduction of carbon dioxide to the reaction mixture may be used for precipitation of silica, but a stronger acid must be used in steps (d) and (i) when it is desired to reduce the pH to values below 7. It is preferred to use strong acid throughout the process. Examples of the strong acids include sulfuric acid, hydrochloric acid, nitric acid, phosphoric acid, and acetic acid. The strong mineral acids such as sulfuric acid, hydrochloric acid, nitric acid, and phosphoric acid are preferred; sulfuric acid is especially preferred.

The acid addition of step (b) is made over a period of at least 10 minutes. Often the acid addition is made over a period of at least 15 minutes. Frequently the acid addition of step (b) is made over a period of from 10 to 60 minutes. From 20 to 40 minutes is preferred.

The temperature of the reaction mixture during the acid addition of step (b) is at or below 98° C. Often the temperature is from 85° C. to 98° C. From 88° C. to 95° C. is preferred.

At least 60 percent of the $M_2O$ present in the initial aqueous alkali metal silicate solution is neutralized during the acid addition of step (b). As much as 100 percent of the $M_2O$ may be neutralized if desired. Preferably from 70 to 90 percent of the M20 is neutralized.

The additions made is step (c) are made over a period of from 30 to 180 minutes. Preferably the additions are made over a period of from 60 to 130 minutes.

The temperature of the reaction mixture during the additions of step (c) is from 85° C. to 98° C. From 88° C. to 95° C. is preferred.

In step (c), the amount of additive aqueous alkali metal silicate added is such that the amount of $SiO_2$ added is from 0.5 to 2 times the amount of $SiO_2$ present in the initial aqueous alkali metal silicate solution established in step a) From 0.8 to 1.2 times the $SiO_2$ present in the initial aqueous alkali metal silicate solution is preferred.

The amount of acid added in step (c) is such that at least 60 percent of the $M_2O$ contained in the additive aqueous alkali metal silicate solution added in step (c) is neutralized. As much as 100 percent of such may be neutralized if desired. Preferably from 70 to 90 percent of the $M_2O$ is neutralized.

The temperature of the reaction mixture during the acid addition of step (d) is from 85° C. to 98° C. From 88° C. to 95° C. is preferred.

In step (d), the acid is added such that the pH of the third reaction mixture is below 9.3. Often the pH is from 6.0 to below 9.3. A pH of from 7.0 to 9.0 is preferred.

The aging in step (e) is optional.

The aging in step (e) is for a period of from 0 to 120 minutes. Often the aging in step (e) is for a period of from 0.1 to 120 minutes. In many cases the third reaction mixture is aged for a period of from 10 to 60 minutes. A period of from 20 to 40 minutes is preferred.

The optional aging of the third reaction mixture in step (e), is accomplished at a pH below 9.3. Often the pH is from 6.0 to below 9.3. A pH of from 7.0 to 9.0 is preferred.

The temperature of the third reaction mixture during the optional aging of step (e) is from 85° C. to 98° C. From 88° C. to 950° C. is preferred.

Acid is added in step (f) as necessary to maintain the pH of the reaction mixture at from 8.0 to 9.3 during the addition of the further quantity of additive aqueous alkali metal silicate solution. A pH of from 8.2 to 9.0 is preferred.

The amount of additive aqueous alkali metal silicate solution added in step (f) is such that the amount of $SiO_2$ added in step (f) is from 0.05 to 0.75 times the amount of $SiO_2$ present in the third reaction mixture. Preferably the amount of additive aqueous alkali metal silicate solution added in step (f) is such that the amount of $SiO_2$ added in step (f) is from 0.25 to 0.6 times the amount of $SiO_2$ present in the third reaction mixture.

The additive alkali metal silicate solution is added in step (f) over a period of at least 30 minutes. A period of from 30 to 180 minutes is often employed. A period of from 60 to 120 minutes is preferred.

The temperature of the fourth reaction mixture during the aging of step (g) is from 85° C. to 98° C. From 88° C. is to 95° C. is preferred.

In step (g), the fourth reaction mixture is aged for a period of from 5 to 60 minutes. A period of from 30 to 60 minutes is preferred.

The temperature of the reaction mixture during the acid addition of step (h) is from 85° C. to 98° C. From 88° C to 95° C. is preferred.

In step (h), the acid is added such that the pH of the fifth reaction mixture is below 7. Often the pH is from 2.5 to below 7. A pH of from 3.0 to 4.5 is preferred.

The fifth reaction mixture is aged in step (i) at a pH below 7. In many cases the pH is from 2.5 to below 7. A pH of from 3.0 to 4.5 is preferred.

The temperature of the fifth reaction mixture during the aging of step (i) is from 85° C. to 98° C. From 88° C to 95° C. is preferred.

In step (i), the fifth reaction mixture is aged for a period of at least 1 minute. Frequently the aging period is at least 5 minutes. Often the aging period is at least 30 minutes. An aging period of at least 50 minutes is preferred.

The separation of step (j) may be accomplished by one or more techniques for separating solids from liquid such as, for example, filtration, centrifugation, decantation, and the like.

The washing of step (k) may be accomplished by any of the procedures known to the art for washing solids. Examples of such procedures include passing water through a filter cake, and reslurring the precipitated silica in water followed by separating the solids from the liquid. One washing cycle or a succession of washing cycles may be employed as desired. The primary purpose of washing is to remove salt formed by the various neutralizations to desirably is low levels. Usually the precipitated silica is washed until the concentration of salt in the dried precipitated silica is less than or equal to 2 percent by weight. Preferably the precipitated silica is washed until the concentration of salt is less than or equal to 1 percent by weight.

The drying of step (1) may also be accomplished by one or more known techniques. For example, the amorphous precipitated silica may be dried in an air oven or in a vacuum oven. Preferably the amorphous precipitated silica is dispersed in water and spray dried in a column of hot air. The temperature at which drying is accomplished is not critical, but the usual practice is to employ temperatures of at least 70° C. Generally the drying temperature is less than 700° C. In most cases drying is continued until the amorphous precipitated silica has the characteristics of a powder. Ordinarily the dried amorphous precipitated silica is not absolutely anhydrous but contains adsorbed water in varying amounts, usually from 1 to 7 weight percent, the particular amount depending partly upon the prevailing relative humidity. Adsorbed water is that water which is removed from the silica by heating at 105° C. for 24 hours at atmospheric pressure in a laboratory oven.

Another optional step which may be employed is size s reduction. Size reduction techniques are themselves well known and may be exemplified by grinding and pulverizing.

Particularly preferred is fluid energy milling using air or superheated steam as the working fluid. Fluid energy mills are themselves well known. See, for example, Perry's Chemical Engineers Handbook, 4th Edition, McGraw-Hill Book Company, New York, (1963), Library of Congress Catalog Card Number 6113168, pages 8–42 and 8–43; McCabe and Smith, Unit Operations of Chemical Engineering, 3rd Edition, McGraw-Hill Book Company, New York (1976), ISBN 0-07-044825-6, pages 844 and 845; F. E Albus, "The Modern Fluid Energy Mill", Chemical Engineering Progress, Volume 60, No. 6 (June 1964), pages 102–106, the entire disclosures of which are incorporated herein by reference. In fluid energy mills the solid particles are suspended in a gas stream and conveyed at high velocity in a circular or elliptical path. Some reduction occurs when the particles strike or rub against the walls of the confining chamber, but most of the reduction is believed to be caused by interparticle attrition.

The degrees of agitation used in the various steps of the invention may vary considerably. The agitation employed during the addition of one or more reactants should be at least sufficient to provide a thorough dispersion of the reactants and reaction mixture so as to avoid more than trivial locally high concentrations of reactants and to ensure that silica deposition occurs substantially uniformly thereby avoiding gellation on the macro scale. The agitation employed during aging should be at least sufficient to avoid settling of solids to ensure that silica deposition occurs substantially uniformly throughout the mass of silica particles rather than preferentially on those particles at or near the top of a settled layer of particles. The degrees of agitation may, and preferably are, greater than these minimums. In general, vigorous agitation is preferred.

Yet another optional step which may be employed is treating the precipitated silica with one or more materials which coat, partially coat, impregnate, and/or partially impregnate the silica. Many materials may be used for this purpose. In general, the type of material used depends upon the effect desired. Most often the materials are organic polymers. Examples of suitable materials include hydrocarbon oils, polyesters, polyamides, phenolic resins, aminoplast resins, polysiloxanes, polysilanes, and the like. The treatment step may be accomplished at any convenient time during or after formation of the precipitated silica.

A preferred embodiment within the first embodiment of the invention is a process for producing amorphous precipitated silica characterized on a coating-free and impregnant-free basis by a BET surface area in the range of from 150 to 180 $m^2/g$, a CTAB surface area in the range of from 145 to 165 $m^2/g$, a Sears surface area in the range of from 210 to 240 $m^2/g$, and a pore diameter at the maximum of the volume pore size distribution function in the range of from 20 to 35 nm, the process comprising: (a) establishing an initial aqueous alkali metal silicate solution containing from 1.5 to 3.6 weight percent $SiO_2$ and having an $SiO_2:M_2O$ molar ratio of from 3.1 to 3.3; (b) over a period of at from 20 to 40 minutes and with agitation, adding acid to the initial aqueous alkali metal silicate solution at a temperature of from 88° C. to 95° C. to neutralize from 70 to 90 percent of the $M_2O$ present in the initial aqueous alkali metal silicate solution and to form a first reaction mixture; (c) over a period of from 60 to 130 minutes, with agitation, and at a temperature of from 88° C. to 95° C., substantially simultaneously adding to the first reaction mixture: (1) additive aqueous alkali metal silicate solution, and (2) acid, to form a second reaction mixture wherein the amount of the additive aqueous alkali metal silicate solution added is such that the amount of $SiO_2$ added is from 0.8 to 1.2 times the amount of $SiO_2$ present in the initial aqueous alkali metal silicate solution established in step (a) and wherein the amount of the acid added is such that from 70 to 90 percent of the $M_2O$ contained in the additive aqueous alkali metal silicate solution added during the simultaneous addition is neutralized; (d) adding acid to the second reaction mixture with agitation at a temperature of from 88° C. to 95° C. to form a third reaction mixture having a pH of from 7.0 to 9.0; (e) aging the third reaction mixture with agitation at a temperature of from 88° C. to 95° C. for a period of from 20 to 40 minutes; (f) forming a fourth-reaction mixture by adding to the aged third reaction mixture with agitation and at a temperature of from 88° C. to 95° C., a further quantity of additive aqueous alkali metal silicate solution and adding acid as necessary to maintain the pH at from 8.2 to 9.0 during the addition of the further quantity of the additive aqueous alkali metal silicate solution, wherein: (1) the amount of the additive aqueous alkali-metal silicate solution added in step (f) is such that the amount of $SiO_2$ added in step (f) is from 0.25 to 0.6 times the amount of $SiO_2$ present in the third reaction mixture, and (2) the additive aqueous alkali metal silicate solution is added in step (f) over a period of from 60 to 120 minutes; (g) aging the fourth reaction mixture with agitation at a temperature of from 88° C. to 95° C. for a period of from 30 to 60 minutes; (h) adding acid to the aged fourth reaction mixture with agitation at a temperature of from 88° C. to 95° C. to form a fifth reaction mixture having a pH of from 3.0 to 4.5; (i) aging the fifth reaction mixture with agitation at a temperature of from 88° C. to 95° C. for a period of at least 50 minutes; (j) separating precipitated silica from most of the liquid of the aged fifth reaction mixture; (k) washing the separated precipitated silica with water; and (l) drying the washed precipitated silica, wherein: (m) the alkali metal silicate is lithium silicate, sodium silicate, potassium silicate, or a mixture thereof; and (n) M is lithium, sodium, potassium, or a mixture thereof.

It is understood that one or more ranges in the preferred embodiment may be used in lieu of the corresponding broader range or ranges in the broader process embodiment of the invention.

The amorphous precipitated silica of the present invention is particulate. The amorphous precipitated silica particles may be in the form of ultimate particles, aggregates of ultimate particles or a combination of both. It is expected that the sizes of filler agglomerates may be reduced during processing of the ingredients to prepare rubber compositions. Accordingly, the distribution of gross particle sizes in the rubber compositions may be smaller than in the amorphous precipitated silica itself before compounding.

The invention is further described in conjunction with the following example which is to be considered illustrative rather than limiting, and in which all parts are parts by weight and all percentages are percentages by weight unless otherwise specified.

EXAMPLE

An additive aqueous sodium silicate solution containing 18 weight percent $SiO_2$ and having an $SiO_2:Na_2O$ molar ratio of 3.25 was prepared. An initial aqueous sodium silicate solution containing 2.2 weight percent $SiO_2$ and having an $SiO_2:Na_2O$ molar ratio of 3.25 was established in a reactor. Over a period of 30 minutes and with agitation, sulfuric acid was added to the initial aqueous sodium silicate solution at a temperature of 90° C. to neutralize 80 percent of the $Na_2O$ present in the initial aqueous sodium silicate solution and to form a first reaction mixture. Additive aqueous sodium silicate solution and sulfuric acid were substantially simultaneously added to the first reaction mixture to form a second reaction mixture wherein the amount of additive aqueous sodium silicate solution added was such that the amount of $SiO_2$ added was equal to the amount of SiO₂ present in the initial aqueous sodium silicate solution first established in the reactor, and wherein the amount of sulfuric acid added was such that 80 percent of the Na₂O contained in the additive aqueous sodium silicate solution added during the simultaneous addition was neutralized. The substantially simultaneous additions were made with agitation over a period of 120 minutes and at a temperature of 90° C. Sulfuric acid was added to the second reaction mixture with agitation at a temperature of 90° C. to form a third reaction mixture having a pH of 8.5. The third reaction mixture was aged with agitation at a pH of 8.5 and at a temperature of from 90° C. for 15 minutes. Additive aqueous sodium silicate solution was added to the aged third reaction mixture with agitation and at a temperature of 90° C. to form a fourth reaction mixture having a pH of 8.5. A fifth reaction mixture was formed by adding to the fourth reaction mixture with agitation and at a temperature of 90° C., a further quantity of additive aqueous sodium silicate solution and adding sulfuric acid as necessary to maintain the pH at 8.5 during the addition of the further quantity of the additive aqueous sodium silicate solution. The amount of the additive aqueous sodium silicate solution collectively added to the aged third reaction mixture and to the fourth reaction mixture was such that the amount of SiO₂ collectively added to the aged third reaction mixture and to the fourth reaction mixture was 0.45 times the amount of SiO₂ present in the third reaction mixture, and the additive aqueous sodium silicate solution was added to the aged third reaction mixture and to the fourth reaction mixture over a collective period of 108 minutes. The fifth reaction mixture was aged with agitation at a temperature of 90° C. for a period of 30 minutes. Sulfuric acid was added to the aged fifth reaction mixture with agitation at a temperature of 90° C. to form a sixth reaction mixture having a pH of 3.4. The sixth reaction mixture was aged with agitation at a pH of 3.4 at a temperature of 90° C. for a period of 30 minutes. Amorphous precipitated silica was separated from most of the liquid of the aged sixth reaction mixture by filtration. The separated amorphous precipitated silica was washed with water and the washed amorphous precipitated silica was spray dried.

The amorphous precipitated silica of the invention has many uses but the preferred use is as a reinforcing pigment in rubber. Therefore, another embodiment of the invention is an elastomeric composition comprising rubber and particles of amorphous precipitated silica distributed therein, wherein the particles of amorphous precipitated silica, prior to being formulated with rubber, are characterized on a coating-free and impregnant-free basis by:

(a) a BET surface area in the range of from 100 to 300 m²/g, (b) a CTAB surface area in the range of from 85 to 250 m²/g, (c) Sears surface area in the range of from 190 to 290 m²/g, and (d) a pore diameter at the maximum of the volume pore size distribution function in the range of from 10 to 60 nm.

The rubber is usually organic rubber or crosslinked silicone rubber. Organic rubber is preferred.

The organic rubbers which can be used in the present invention are numerous and widely varied. Examples of organic rubbers which may be used include saturated rubbers such as butyl rubber (IIR), bromobutyl rubber (BIIR), chlorobutyl rubber (CIIR), hydrogenated nitrile rubber (HNBR), chlorosulfonated polyethylene (CSM), and terpolymers of ethylene-propylene with a diene rubber (EPDM). Other examples is include general purpose diene rubbers such as natural rubber (NR), cis-polyisoprene (IR), chloroprene rubber (CR), nitrile rubber (NBR), and polybutadiene (BR) and its copolymers containing styrene (SBR). One organic rubber or a mixture of different rubbers may be used as desired. Crosslinked organic rubber is preferred. Rubber products such as tires, shoes, hoses, belts, and mounts, for example, can benefit from use of the amorphous precipitated silica particles of the invention.

The silicone rubbers which can be used in the present invention are similarly numerous and widely varied. Any of the known silicone rubber gums which can be cured by means of a free radical generator to form crosslinked silicone rubber can be used. Examples of silicone gums include the methyl, vinyl, phenyl, methyl vinyl, methyl phenyl, and fluorinated silicone gums.

The amount of amorphous precipitated silica present in the elastomeric composition may vary widely. In general it is present in an amount sufficient to reinforce the rubber. Usually the amorphous precipitated silica is present in the elastomeric composition in the range of from 2 to 120 parts of silica per 100 parts of rubber, by weight. In many cases the amorphous precipitated silica is present in the elastomeric composition in the range of from 5 to 100 parts of silica per 100 parts of rubber, by weight. Preferably the amorphous precipitated silica is present in the elastomeric composition in the range of from 10 to 80 parts of silica per 100 parts of rubber, by weight.

Although the present invention has been described with reference to specific details of certain embodiments thereof, it is not intended that such details should be regarded as limitations upon the scope of the invention except insofar as they are included in the accompanying claims.

We claim:

1. A statistically large population of substantially dry free-flowing particles of amorphous precipitated silica characterized on a coating-free and impregnant-free basis by:

(a) a BET surface area in the range of from 150 to 185 m²/g, (b) a CTAB surface area in the range of from 135 to 185 m²/g, (c) a Sears surface area in the range of from 190 to 290 m²/g, and (d) a pore diameter at the maximum of the volume pore size distribution function in the range of from 10 to 60 nm.

2. The statistically large population of substantially dry free-flowing particles of amorphous precipitated silica of claim 1 characterized on a coating-free and impregnant-free basis by:

(a) a Sears surface area in the range of from 200 to 265 m²/g, and (b) a pore diameter at the maximum of the volume pore size distribution function in the range of from 20 to 50 nm.

3. The statistically large population of substantially dry free-flowing particles of amorphous precipitated silica of claim 1 characterized on a coating-free and impregnant-free basis by:

(a) a BET surface area in the range of from 150 to 180 m²/g, (b) a CTAB surface area in the range of from 145 to 165 m²/g, (c) a Sears surface area in the range of from 210 to 240 m²/g, and (d) a pore diameter at. the maximum of the volume pore size distribution function in the range of from 20 to 35 nm.

* * * * *